United States Patent [19]

Ballun

[11] Patent Number: 4,739,794
[45] Date of Patent: Apr. 26, 1988

[54] ROTATABLE VALVE WITH ANTI-CAVITATION STRUCTURE

[75] Inventor: John V. Ballun, Plainfield, Ill.

[73] Assignee: AMSTED Industries Incorporated, Chicago, Ill.

[21] Appl. No.: 901,630

[22] Filed: Aug. 29, 1986

[51] Int. Cl.⁴ ............................................. F17D 1/20
[52] U.S. Cl. .................................................. 137/599
[58] Field of Search ............ 137/599, 603, 462, 513.7; 251/117

[56] References Cited

U.S. PATENT DOCUMENTS

| | | | |
|---|---|---|---|
| 1,464,614 | 8/1923 | Nacey et al. | 137/513.7 X |
| 2,271,535 | 2/1942 | Barker | 137/462 X |
| 3,695,290 | 10/1972 | Evans | 137/563 |
| 4,384,593 | 5/1983 | Keller | 137/625.3 X |

FOREIGN PATENT DOCUMENTS

| | | | |
|---|---|---|---|
| 1266151 | 5/1961 | France | 137/892 |
| 0137787 | 8/1982 | Japan | 137/599 |

Primary Examiner—Martin P. Schwadron
Assistant Examiner—Stephen M. Hepperle
Attorney, Agent, or Firm—Charles E. Bouton; Edward J. Brosius

[57] ABSTRACT

An anti-cavitation arrangement for a rotary valve including a conduit by-passing the valve passage and connecting the upstream end to the downstream end of the valve passage. A normally closed pressure controlled or manual valve is disposed in the conduit and is open upon sensing a vacuum on the downstream end of the valve or by manual means so that process fluid is free to flow into the vacuum and thereby prevent cavitation.

4 Claims, 1 Drawing Sheet

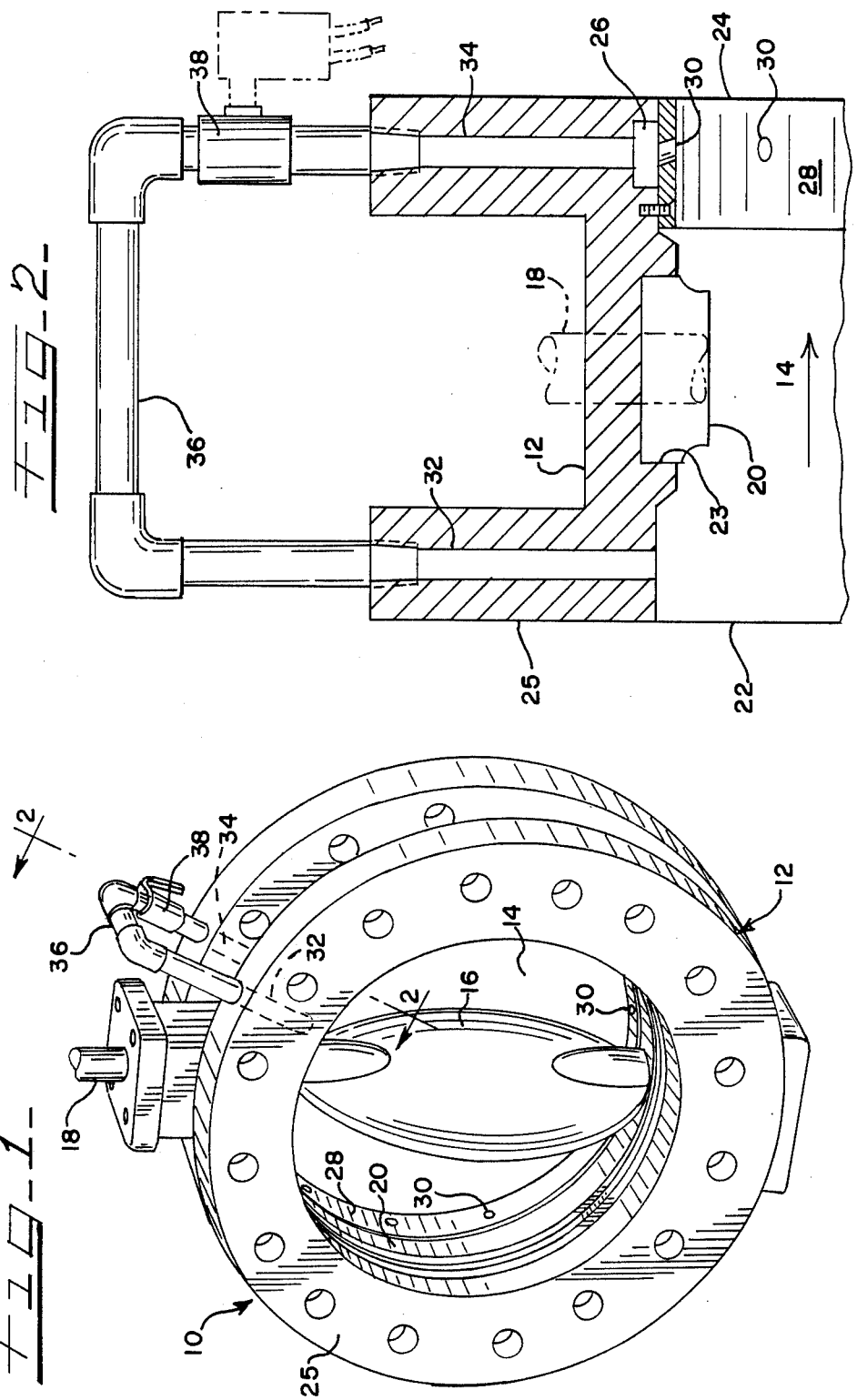

ROTATABLE VALVE WITH ANTI-CAVITATION STRUCTURE

The present invention relates generally to rotating valves such as ball and butterfly valves and more particularly to an improved structure for preventing cavitation in the fluid passage adjacent to the valve closure.

Rotary valves such as butterfly and ball valves generally include a housing and a fluid passage therethrough. A valve closure member is located in the fluid passage and movable between a closed position preventing fluid flow through the valve or an open position to allow fluid flow through the passage. The valve housing may be provided with radially extending flanges located on opposite ends of the passage. The flanges have a plurality of longitudinally extending angularly spaced openings through which fastening means are inserted for fastening pipeline ends to the housing.

In operation the valve closure is partially opened whereby the cross-sectional area of the passage through which the fluid flows is reduced. The reduction in flow area creates a concurrent increase in the flow velocity in the section of the pipeline immediately downstream from the valve closure.

The increased flow velocity results in a decrease in the pressure of the fluid in this section and often forms a low-pressure vapor pocket. The vapor pocket expands in volume as the fluid vaporizes until the pressure surrounding the pocket exceeds the vapor pressure therein whereupon the vapor pocket collapses. This expansion and contraction occurs repetitively and generates forces which react on the valves and the adjacent pipeline. Particularly in liquid flow the forces may be of a magnitude to cause damage to the valve or pipeline. This reaction of repetitive collapsing of the vapor pocket formed adjacent the closure members is commonly known as cavitation.

Heretofore, in one type of rotary valve the cavitation is eliminated by providing a plurality of uniformly distributed openings on the downstream face of a valve closure member formed with a cavity. The cavity of the closure member is charged with a pressurized gas which is vented through the openings to provide pressure in the flow passage section in which the cavitation tends to occur. This increase in pressure in the flow passage prevents the formation of the low pressure vapor pocket thereby eliminating cavitation. It should be readily apparent that this type of anti-cavitation structure is relatively expensive and costly.

In another type of anti-cavitation arrangement, an annular ring having a plurality of radially extending ports is attached between the downstream side of the valve and the end of the pipeline connected to the valve. The ports communicate between the outer and inner faces of the valve housing. The ports are located to enter the valve passage in the section in which cavitation occurs so that air from the exterior of the valve may enter the fluid passage of the valve.

The foregoing prior art devices each utilize an extraneous gaseous medium other than the process fluid to prevent the formation of the vapor cavities and thereby the cavitation. This introduction of an extraneous gaseous medium, such as air, into the valve and pipeline is not always desirable primarily because the gaseous medium may contaminate the process fluid in the pipeline or otherwise adversely affect the flow characteristics of the process fluid therethrough or the operation of downstream pumps.

Another arrangement for preventing cavitation by utilizing process liquid passing through a pipeline is shown in U.S. Pat. No. 2,125,330. While this patent utilizes process liquid to prevent cavitation, it is extremely complex and is dependent on the reverse flow of the process liquid on the downstream side of the valve toward the valve into the cavitating sector. This results in a fluid connection between the valve body and the pipeline which may have the tendency to adversely affect the flow rate of the process liquid on the downstream side of the valve.

SUMMARY OF THE PRESENT INVENTION

By the present invention it is proposed to provide an economical anticavitation structure for a rotary valve which is embodied as an integral part of the valve. The anticavitation structure includes a parallel conduit connecting the valve body upstream inlet end with the valve body downstream outlet end. The downstream end is provided with a plurality of angularly spaced jets which are arranged to discharge process fluid passing through the parallel by-pass conduit about the periphery of the rotary valve and into the passage of the outlet end into the sector in which cavitation generally occurs. The flow is sufficient to increase the pressure in the downstream pipe but not appreciably add to the volume of media controlled by the main rotary valve.

Flow through the parallel by-pass conduit may be controlled by a manual or solenoid valve located in the by-pass adjacent to the downstream outlet of the valve.

To achieve a substantially uniform distribution of the by-passed process fluid into the cavitating sector the downstream outlet of the valve body is provided with equiangularly spaced jets communicating with the downstream outlet of the valve. The jets are arranged to introduce process liquid relatively evenly about the entire circumference of the valve body.

Further features of the invention will be apparent from the following specification.

DESCRIPTION OF THE DRAWINGS

FIG. 1 is a perspective view of a butterfly valve and valve body embodying the anti-cavitation structure of the present invention.

FIG. 2 is a cross-sectional view of the valve body taken generally through the lines 2—2 of FIG. 1.

DESCRIPTION OF THE PREFERRED EMBODIMENT

Referring now to the drawings the invention of the present invention is shown embodied in a rotary valve 10 of the butterfly valve type. However the invention may also be applied to rotary valves of the ball or plug type.

The butterfly valve generally 10 includes a cylindrical body or housing 12 having an axial flow passage 14 therethrough. A valve closure or disc 16 having a convex lens configuration is supported by a shaft 18 and turnably mounted in the passage between an open and closed position to regulate the flow through a pipeline (not shown) in the usual manner.

The disc 16 as shown in FIG. 1 is in an open position so that the fluid is free to flow through the passage 14. The disc 16 may be rotated to a closed position (not shown) by turning the shaft 18 so that the circumference of the disc 16 seals against a resilient seal 20 provided in the housing 12. Fluid flow through the passage 14 is cut-off when the valve disc 16 is in the sealed position.

The housing 12 is formed with an inlet upstream opening or end 22 and an outlet downstream opening or end 24. The valve body or housing 12 may be provided with flanges 25 at each end to which pipeline sections may be secured.

As shown the valve passage 14 is of generally circular cross section along its length but can be oval for plug valve designs. The resilient valve seal 20 made from rubber or the like is inserted in a groove 23 formed in the wall defining the fluid passage 14.

In accordance with the present invention the valve housing 12 about the outlet or downstream opening 24 is provided with a circumferential groove 26 along the inner wall thereof. Fixed to the inner wall of the outlet 24 is a distribution ring 28 which seats over the groove 26 so as to provide an annular channel. A plurality of angularly spaced jets or orifices 30 is formed in the ring 28. The jets 30 serve to introduce process fluid into the downstream end 24 of the valve body 12 about the inner circumference close to the butterfly valve disc 16 as more fully to be explained hereinafter. Preferably the jets 30 are also inclined in the direction of fluid flow through the flow passage 14 to prevent reverse flow from water impingement.

A conduit or multitude of conduits or pipe 36 extends from a radial extending port 32 on the upstream side of the valve to a radial port 34 on the downstream side of the valve body bypassing the butterfly valve disc 16. As shown the downstream radial port 34 discharges into the groove or annular channel 26.

A valve 38 is located in the conduit 36 above the circular channel 26 to control fluid movement through conduit 36. The valve 38 may be manually or automatically operated by a position switch or pressure switch to allow closure and fluid stoppage when the disc 16 is fully closed into the seat 20. A suitable automatic form of valve 38 may be a two-way solenoid valve, ASCO Model 8210 manufactured by Automatic Switch Co. 50-56 Hanover Road, Florham Park, N.J. is used shown in phantom in FIG. 2. Such two-way valve 38 is normally closed and can be energized electrically by a position switch or pressure switch on the rotary valve when it is rotated in the open direction or the downstream pressure drops. Accordingly when the rotary valve is closed, the solenoid valve is de-energized and blocks fluid flow between the upstream and downstream ends 22 and 24 of the butterfly valve 10 and into the annular channel 26. It is to be noted that the angularly spaced jets or orifices 30 are located in close proximity to the valve disc 16 so as to effectively introduce the process liquid into the cavitating section and thereby reduce or eliminate the cavitation.

Preferably, as shown in the drawings, the radial ports 32, 34 extend through the flanges 25 at the upstream and downstream ends 22, 24 of the valve body or housing 12, in which case the circumferential groove 26 and ring 28 are inward of a flange. In this way the anticavitation bypass of process fluid is self-contained within the structure of the valve generally 10 thereby eliminating the cost of piping in the field.

What is claimed is:

1. In a valve comprising a cylindrical body having a fluid passage extending from an upstream end to a downstream end with flanges at each said end for connection to pipeline sections, and a valve closure member rotatably mounted in said cylindrical body between said upstream end and said downstream end, the improvement comprising:

a conduit by-passing said valve closure member and extending between radial ports in each of said flanges and communicating with said passage at said upstream end and said downstream end, and valve means in said conduit for isolating and closing said conduit in the absence of a low pressure on said downstream end as occurs during cavitation and opening said conduit to permit flow therethrough in the presence of a low pressure on said downstream end and thereby to reduce cavitation.

2. The invention as defined in claim 1 wherein said cylindrical body at said downstream end of said passage inward of said flange is provided with a plurality of annularly spaced jets through which the fluid from said conduit is discharged during cavitation, said jets being inclined at an acute angle to the direction of fluid flow through said passage.

3. The invention as defined in claim 2 wherein said body at said downstream end is provided with an annular channel inward of said flange into which the fluid from said conduit is initially introduced, and said spaced jets communicate with said annular channel.

4. The invention as defined in claim 3 wherein said annular channel is formed in said valve body and said jets are provided in a ring overlying said annular channel and fixed to said body.

* * * * *